M. PETTERSON.
STABILIZER.
APPLICATION FILED FEB. 11, 1918.
1,295,059.
Patented Feb. 18, 1919.
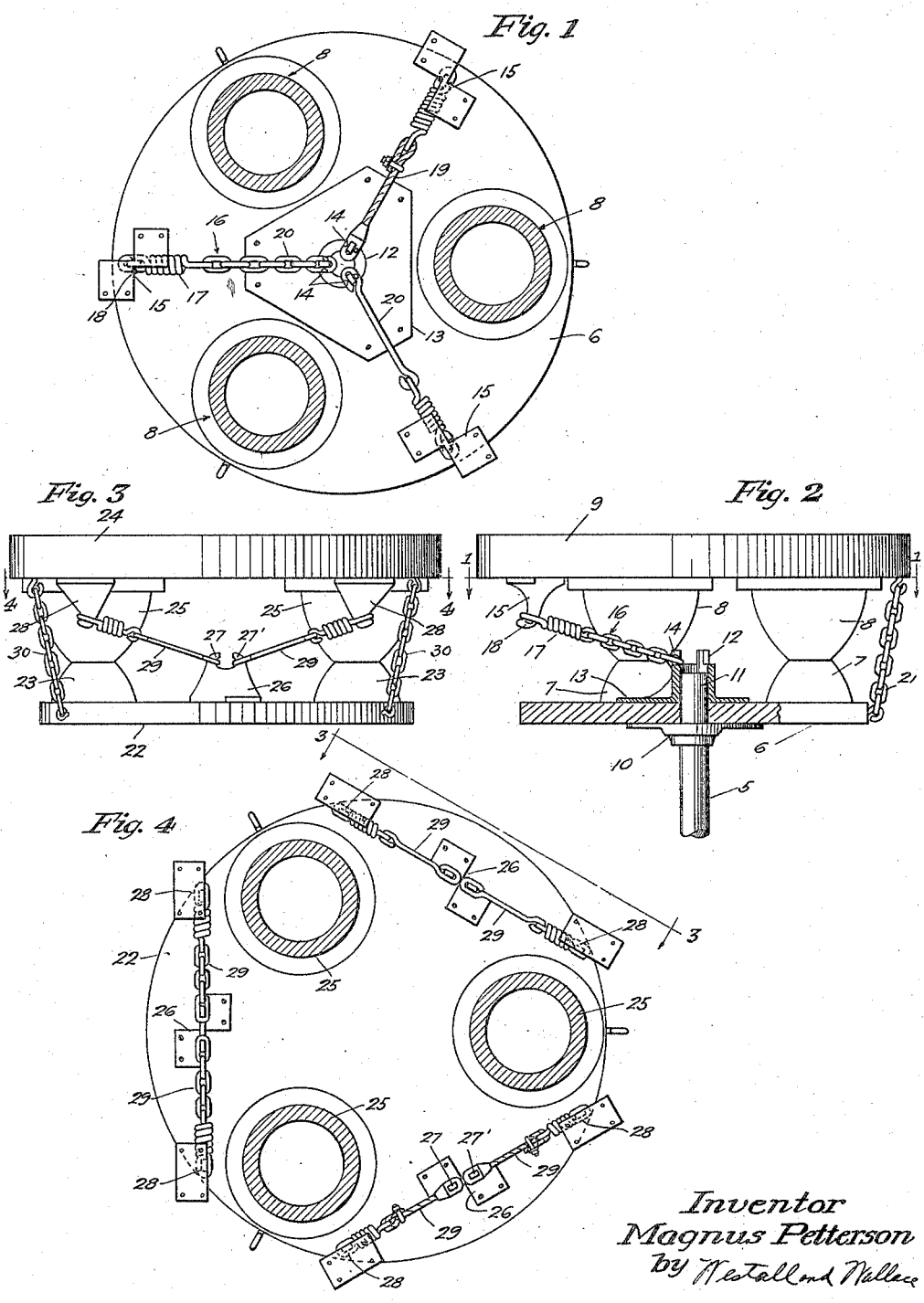
Inventor
Magnus Petterson
by Westall and Wallace
his Attorneys

UNITED STATES PATENT OFFICE.

MAGNUS PETTERSON, OF LONG BEACH, CALIFORNIA.

STABILIZER.

1,295,059.

Specification of Letters Patent. Patented Feb. 18, 1919.

Application filed February 11, 1918. Serial No. 216,621.

*To all whom it may concern:*

Be it known that I, MAGNUS PETTERSON, a citizen of the United States, residing at Long Beach, in the county of Los Angeles and State of California, have invented new and useful Improvements in Stabilizers, of which the following is a specification.

This invention relates to a stabilizer for tying two independently movable members together to prevent displacement, and is especially suited to members of the character described, which are separated by resilient means.

In the embodiments thereof disclosed herein the members comprise elements of a cushion seat, but the invention is not limited thereto.

The objects of this invention are first, to provide a stabilizer which will permit movement of the members to and from each other, but prevent lateral displacement and rotation; and second, to provide a stabilizer of the character described which will permit rocking of the members relative to one another.

I accomplish these objects by means of the embodiments of my invention illustrated in the accompanying drawing, in which:

Figure 1 is a section through a seat having one form of my stabilizer applied thereto, the section being taken on the line 1—1 of Fig. 2. Fig. 2 is an elevation partly in section of the seat shown in Fig. 1 with one of the deformers and its coöperating absorber removed to better show the stabilizer. Fig. 3 is an elevation partly in section, as seen looking in the direction of the arrows 3—3 in Fig. 4, of a seat having a modified form of stabilizer. Fig. 4 is a section of the seat shown in Fig. 3 as seen on the line 4—4 of Fig. 3.

Referring more particularly to Figs. 1 and 2 of the drawing, 5 indicates a pillar which supports the seat. Resting thereon is a base 6. The base 6 is provided with deformers 7, which contact with absorbers 8 mounted upon the seat 9.

The pillar 5 is provided with a collar 10 upon which the base 6 rests. The upper end of the pillar 6 is formed with a stem 11 which is disposed in a socket on the base 6.

As shown, the base 6 is circular in form, although it may be of any other shape, and has a tubular socket member 12 secured thereto with the opening registering with a bore in the base 6. The socket tube 12 is slit to form fingers 14 for attachment of the tie members. Three deformers indicated by 7 are fixed to the base 6. In Fig. 2 the right hand deformer and the coöperating absorber on the seat is removed to show the stabilizer.

The seat 9 has depending from its underside absorbers 8. These absorbers are preferably pneumatically inflated bulbs. The construction shown, broadly consists of a number of pneumatic absorbers 8, each one of which rests upon a deformer 7. Fixed to the under side of seat 9 are a number of bracket hooks 15.

Connecting corresponding fingers 14 and brackets 15 are tie members. Tie member 16 comprises a length of chain, to the end of which is attached a tension spring 17. The free end of the chain is hooked over finger 14. The free end of the spring 17 is hooked over the bracket hook 15 and held in place by a cotter pin 18. The length of tie member 16 is such that when in position it is under tension. Tie member 19 differs from tie member 16, in that, a cable is substituted for the chain. Tie member 20 differs from tie member 16, in that, a rod is substituted for the chain. The tie members shown are the equivalents of each other, and are merely shown different to indicate that the invention is not confined to the use of any specific construction of tie member, in fact, each may be one entire spring or formed of resilient material such as rubber.

It is evident that the seat member 9 and the base 6 are independent of one another except in so far as they are tied to each other by the tie members which comprise a part of the stabilizer. The seat member rests upon the base 6 through the medium of the pneumatic absorber and the deformer, and can rock in any direction or move to and from the base without hindrance by the stabilizer. The springs in the tie members take up any slack which occurs by reason of the tie members having their radius shortened as the seat and base move to and from each other. It is evident that substantially no rotation can take place between the seat and base, and no lateral movement.

In order to prevent any portion of the seat 9 rising above its normal height, which might occur when the seat tilts, I have added a number of anchor chains 21, one end of a chain being fixed to the seat 9 and the other to the base 6. When weight is placed on one side of the seat, no part can rise above the normal height and the pressure is more equally distributed on the absorbers.

Referring to Figs. 3 and 4, a modified form of stabilizer is shown. There is a base 22 having deformers 23 mounted thereon, and a seat 24 having pneumatic absorbers 25 depending therefrom. Fixed to the base 22 are hook brackets 26, there being three. Each hook bracket is provided with oppositely disposed hooks 27 and 27'. Depending from the seat 23 are hook brackets 28. There are six of the brackets 28. Tie members 29 extend from each of the hook brackets 28 to brackets 26. The tie members 29 are in pairs, so that one bracket member 26 is held in position between two adjacent bracket members 28. The tie members 29 are constructed similar to the tie members of the form of seat first described. Anchor chains 30 are also provided to limit the rise of the seat.

It is evident that there may be movement to and from each other of the seat members 24 and the base 22, but that there can be no lateral movement or rotation of the members relative to each other. The seat and base are independent except for the stabilizer which ties the two together.

It will be noted that in both constructions shown there is no hindrance to the cushioning action between the seat and base, yet the two members are held in stable relation to one another. I do not limit myself to the particular pneumatic cushion construction shown, but contemplate the use of any cushioning means which separate two independent members. Thus, my invention can be applied as a cushion between the body and frame of a vehicle. There are various other structures to which my stabilizer may be applied.

What I claim is:

1. The combination of two juxtaposed members separated by pneumatic cushions in contact with absorbers and unattached thereto, and a stabilizer tying said members together comprising a plurality of pairs of resilient tie members, each tie member fixed at one end to one of said juxtaposed members and at the other end to the other of said juxtaposed members, each tie member of a pair being arranged to pull against the other tie member of the pair.

2. The combination of two juxtaposed members separated by pneumatic cushions in contact with absorbers and unattached thereto, and a stabilizer tying said members together comprising a plurality of pairs of resilient tie members, each tie member being fixed at one end to one of said juxtaposed members and at the other end to the other of said juxtaposed members, each tie member of a pair pulling against the other tie member of the pair substantially in a plane transverse to the cushioning motion of said juxtaposed members.

3. The combination of two juxtaposed members separated by resilient means and unattached thereby, and a stabilizer tying said members together comprising a plurality of pairs of resilient tie members, each tie member being fixed at one end to one of said juxtaposed members and at the other end to the other of said juxtaposed members, each tie member of a pair being arranged to pull against the other.

4. The combination of two juxtaposed members separated by resilient means and unattached thereby, and a stabilizer tying said members together comprising a plurality of pairs of resilient tie members, each tie member being fixed at one end to one of said juxtaposed members and at the other end to the other of said juxtaposed members, each tie member of a pair pulling against the other substantially in a plane transverse to the cushioning movement of said juxtaposed members.

In witness that I claim the foregoing, I have hereunto subscribed my name this 2nd day of February, 1918.

MAGNUS PETTERSON.

Copies of this patent may be obtained for five cents each, by addressing the "Commissioner of Patents, Washington, D. C."